US007758847B2

(12) United States Patent
Luo et al.

(10) Patent No.: US 7,758,847 B2
(45) Date of Patent: Jul. 20, 2010

(54) MOLECULAR SIEVE WITH MFI STRUCTURE CONTAINING PHOSPHORUS AND METAL COMPONENTS, PREPARATION PROCESS AND USE THEREOF

(75) Inventors: Yibin Luo, Beijing (CN); Ying Ouyang, Beijing (CN); Xingtian Shu, Beijing (CN); Mingyuan He, Beijing (CN); Dianzhong Wang, Beijing (CN); Baoning Zong, Beijing (CN); Minggang Li, Beijing (CN)

(73) Assignees: China Petroleum & Chemical Corporation, Beijing (CN); Research Institute of Petroleum Processing, Sinopec, Beijing (CN)

( * ) Notice: Subject to any disclaimer, the term of this patent is extended or adjusted under 35 U.S.C. 154(b) by 691 days.

(21) Appl. No.: 10/577,672

(22) PCT Filed: Oct. 28, 2004

(86) PCT No.: PCT/CN2004/001230

§ 371 (c)(1),
(2), (4) Date: Jun. 28, 2007

(87) PCT Pub. No.: WO2005/042404

PCT Pub. Date: May 12, 2005

(65) Prior Publication Data

US 2007/0275852 A1 Nov. 29, 2007

(30) Foreign Application Priority Data

Oct. 31, 2003 (CN) .................. 2003 1 0103041

(51) Int. Cl.
*C01B 39/10* (2006.01)
*C01B 39/38* (2006.01)
*B01J 29/072* (2006.01)
*B01J 29/46* (2006.01)

(52) U.S. Cl. .................. 423/700; 423/713; 502/61; 502/74; 502/77

(58) Field of Classification Search .................. 423/700, 423/713; 502/61, 74, 77
See application file for complete search history.

(56) References Cited

U.S. PATENT DOCUMENTS

| 3,755,538 | A | * | 8/1973 | Albers et al .................. 423/710 |
| 3,756,942 | A | | 9/1973 | Cattanach et al. |
| 3,758,403 | A | | 9/1973 | Rosinski et al. |
| 3,845,150 | A | | 10/1974 | Yan et al. |
| 4,157,293 | A | | 6/1979 | Plank et al. |
| 4,175,057 | A | | 11/1979 | Davies et al. |
| 4,180,689 | A | | 12/1979 | Davies et al. |
| 4,288,645 | A | | 9/1981 | Wagstaff et al. |
| 4,334,114 | A | | 6/1982 | Ellis et al. |
| 4,350,835 | A | | 9/1982 | Chester et al. |
| 4,407,728 | A | | 10/1983 | Ball et al. |
| 4,636,483 | A | | 1/1987 | Kjell et al. |
| 4,654,511 | A | * | 3/1987 | Horsma et al. .............. 219/548 |
| 4,766,265 | A | | 8/1988 | Desmond et al. |
| 4,795,844 | A | | 1/1989 | Martindale et al. |
| 5,110,776 | A | | 5/1992 | Chitnis et al. |
| 5,171,921 | A | | 12/1992 | Gaffney et al. |
| 5,236,880 | A | | 8/1993 | Chapman |
| 5,318,696 | A | | 6/1994 | Kowalski |
| 5,951,963 | A | * | 9/1999 | He et al. ..................... 423/713 |
| 5,997,728 | A | | 12/1999 | Adewuyi et al. |

FOREIGN PATENT DOCUMENTS

| CN | 86108104 | 8/1987 |
| CN | 1034223 | 7/1989 |
| CN | 1052290 | 6/1991 |
| CN | 1057408 | 1/1992 |
| CN | 1058382 | 2/1992 |
| CN | 1062100 | 6/1992 |
| CN | 1081938 | 2/1994 |
| CN | 1147420 | 4/1997 |
| CN | 1194181 | 9/1998 |
| CN | 1284405 | 2/2001 |
| CN | 1421508 | 6/2003 |
| EP | 0050021 | 4/1982 |
| EP | 0184927 | 6/1986 |
| EP | 0215579 | 3/1987 |
| EP | 0216491 | 4/1987 |
| EP | 0224162 | 6/1987 |
| EP | 0228267 | 7/1987 |
| EP | 0252705 | 1/1988 |
| EP | 0474536 | 3/1992 |
| WO | WO-83/03813 | 11/1983 |

OTHER PUBLICATIONS

International Search Report in PCT/CN2004/001230 dated Feb. 24, 2005.
Cuiding et al. (Ed.), "Analytic Methods in Petrochemical Engineering (Experimental Methods for RIPP" Science Press, 1990 (p. 11 of specification).
Meriaudeau, P., Zeolites: Facts, Figures, Future, 1423-1429, 1989 (p. 6 of specification).
Shapiro, E.S., International Symposium on Zeolites as Catalysts, Sorbents and Detergent Builders RFA, 73, 1998 (p. 6 of specification).

* cited by examiner

*Primary Examiner*—David M Brunsman
(74) *Attorney, Agent, or Firm*—Marshall, Gerstein & Borun LLP

(57) ABSTRACT

A MFI-structured molecular sieve containing phosphorus and metal components has a formula expressed in anhydrous form and on the basis of oxide weight, as follows: (0~0.3) $Na_2O$ (0.5~5.5) $Al_2O_3$ (1.3~10) $P_2O_5$ (0.7~15) $M1_xO_y$ (0.01~5) $M2_mO_n$ (70~97) $SiO_2$, wherein M1 is one of transition metals selected from the group consisting of Fe, Co and Ni, and M2 is any one of metals selected from the group consisting of Zn, Mn, Ga and Sn. Preparation processes and uses of the instant molecular sieve are also provided. The molecular sieve has an excellent performance for increasing the yield of lower olefins and increasing the aromatics content in gasoline, and can be used as a shape-selective active component for the catalytic cracking catalyst of petroleum hydrocarbons or its additives.

22 Claims, No Drawings

US 7,758,847 B2

MOLECULAR SIEVE WITH MFI STRUCTURE CONTAINING PHOSPHORUS AND METAL COMPONENTS, PREPARATION PROCESS AND USE THEREOF

CROSS-REFERENCE TO RELATED APPLICATIONS

This is the U.S. national phase application of International Application No. PCT/CN2004/001230, filed Oct. 28, 2004, which claims the benefit of Chinese patent application No. 200310103041.5, filed Oct. 31, 2003.

TECHNICAL FIELD

The present invention relates to a molecular sieve having MFI structure and preparation processes and uses of the same, more particularly, to a MFI-structured molecular sieve containing phosphorus and metal components, and preparation processes and uses of the same.

BACKGROUND ART

A typical one of the molecular sieves having MFI structure is ZSM-5 zeolite that was developed by US Mobil Corp. in early 1970s. It has unique porous channel structure and has been used broadly in reaction processes such as alkylation, isomerization, disproportion, catalytic cracking, catalytic dewaxing and the like. Catalytic cracking is one of important process techniques for producing light olefins and improving gasoline octane number. For most of catalytic cracking units, using a catalyst or additive that contains a molecular sieve having MFI structure is an effective way for increasing the production of propylene and butylene, and the octane number of gasoline.

In U.S. Pat. No. 3,758,403, a process is disclosed for boosting the octane number of gasoline and increasing the yield of $C_3$-$C_4$ olefins by adding ZSM-5 molecular sieve into the catalytic cracking catalyst. For example, when a conventional catalyst containing 10% REY is added with ZSM-5 molecular sieve from 1.5%, 2.5%, 5% or up to 10%, the gasoline octane number and the yield of lower olefins are increased. However, the increasing amplitude is reduced with increasing the amount of ZSM-5 molecular sieve added. Using an additive that contains ZSM-5 molecular sieve has the same effect.

U.S. Pat. No. 5,318,696 teaches a hydrocarbon conversion process based on a catalyst that consists of a macroporous molecular sieve and a molecular sieve having MFI structure with a silica-alumina ratio less than 30. This process is to produce gasoline of high octane number and increase the production of lower olefins, especially propylene, by modifying the catalytic cracking process.

U.S. Pat. No. 5,997,728 discloses a method for using a great amount of shape-selective cracking additive in the catalytic cracking process of heavy feed stocks. Said additive consists of 12-40% of ZSM-5 molecular sieve in an amorphous matrix, and has at least 10% of the inventory in the system so that the proportion of ZSM-5 in the catalyst exceeds 3%. This method can result in increasing the yield of lower olefins to a great extent while no further increase in aromatic output or loss in gasoline yield occurs.

CN 1034223A discloses a cracking catalyst for producing lower olefins, which consists of 0~70% of clay, 5~99% of inorganic oxides and 1~50% of zeolite (based on weight of the catalyst), wherein the zeolite is a mixture consisting of 0~25 wt % of REY or silica-rich γ-zeolite and 75~100 wt % of phosphorus- and rare earth-containing silica-rich zeolite having five-membered ring. The catalyst has higher hydrothermal activity stability, conversion rate and $C_2^=$~$C_4^=$ yield than the catalyst containing HZSM-5 zeolite as an active component.

CN 1147420A discloses a phosphorus- and rare earth-containing molecular sieve having a MFI structure with the following formula in an anhydrous form regarding its chemical composition: $aRE_2O_3bNa_2OAl_2O_3cP_2O_5dSiO_2$, wherein a=0.01~0.25, b=0.005~0.02, c=0.2~1.0, d=35~120. When used for converting hydrocarbons at an elevated temperature, the molecular sieve has excellent hydrothermal stability of activity and better selectivity for lower olefins.

After ZSM-5 molecular sieve is modified with a phosphorus-containing compound, the stability of cracking activity can be improved, and the amount of the molecular sieve used can be decreased.

In U.S. Pat. No. 5,110,776, a method is disclosed for preparing a phosphorus-modified ZSM-5 molecular sieve catalyst. Said phosphorus-modifying process is carried out by dispersing the molecular sieve in an aqueous solution containing a phosphorous compound at pH value of 2~6, The aqueous mixture containing phosphate modified zeolite is then combined with matrix precursors to form a slurry. The slurry is preferably spray dried to form the catalyst. The catalyst obtained results in increasing gasoline octane number without increasing the yields of dry gas and coke.

U.S. Pat. No. 5,171,921 discloses a phosphorus-modified ZSM-5 molecular sieve. After impregnated with a phosphorus-containing compound and then treated with water vapor at 500~700° C., the molecular sieve having a silica-alumina ratio of 20~60 has a higher activity when used in the reaction for converting $C_3$~$C_{20}$ hydrocarbons into $C_2$~$C_5$ olefins, as compared with the HZSM-5 that is not subjected to treatment with phosphorus compounds.

The methods for modifying a molecular sieve with metals and their uses have been reported as follows. For example, U.S. Pat. No. 5,236,880 discloses a catalyst comprising a MFI- or MEL-structured molecular sieve. When the catalyst with the modified molecular sieve added is used in conversion of paraffin, the octane number of $C_5$~$C_{12}$ gasoline, the aromatic content, and/or the gasoline yield can be increased. Therefore, the catalyst that contains the molecular sieve thus modified can boost the octane number of gasoline and increase the yield of $C_3$~$C_4$ olefins. The molecular sieve used is one modified with Group VIII metals, preferably Ni. The molecular sieve, after introduction of Ni, is subjected to thermal or hydrothermal treatment at a controlled severe temperature to make Group VIII metals and aluminum enriched on surface.

CN 1057408A discloses a cracking catalyst containing a silica-rich zeolite that has higher activity of catalytic cracking, wherein said silica-rich zeolite is a ZSM-5, β-zeolite or mordenite which contains 0.01~3.0 wt % of phosphorus, 0.01~1.0 wt % of iron or 0.01~10 wt % of aluminum, and is obtained by heating a H-type or K-type ZSM molecular sieve, aβ-zeolite or a mordenite having a silica-alumina ratio of higher than 15 at 350~820° C., and then passing an aqueous solution of an aluminum halide, aqueous solution of a ferric halide or aqueous salt of an ammonium phosphate through it in a volume space velocity of 0.1~10 $hr^{-1}$.

The aromatization of lower alkane is an effective process for increasing utility value of lower alkane, and is one of efficient ways for optimizing the utility of carbon resources, because aromatization products can increase aromatics content of gasoline and thus the gasoline octane number Researches on aromatization reactions of lower alkane have been done for many years to obtain a mixture of benzene, toluene, ethylbenzene and xylene (BTEX). Using alumino-silicates, especially molecular sieves having a high silica-alumina ratio as a catalyst for aromatization processes has been extensively researched, and especially extensive works have been done on using ZSM-5, ZSM-11, and/or ZSM-21 molecular sieves as the catalyst for the processes. In 1973, a process has been disclosed for aromatizing lower hydrocarbons (saturated and non-saturated) from cracking gasoline and coking gasoline or pyrolytic gasoline using a zeolite having a MFI structure (U.S. Pat. No. 3,756,942 and U.S. Pat. No. 3,845,150).

U.S. Pat. No. 4,288,645 discloses a process for producing aromatics mixture and hydrogen gas from light hydrocarbons containing at least 50% of propane using an alumino-silicate catalyst carrying Zn. This process requires that the light hydrocarbon contain desirably more than 60% of propane and less than 20% of methane and ethane. U.S. Pat. No. 4,175,057 and U.S. Pat. No. 4,180,689 disclose an aromatization reaction of propane and butane in the presence of a catalyst based on gallium and a MFI zeolite. After the patents, lots of other modified processes have been developed comprising modification of the catalyst (U.S. Pat. No. 4,795,844), increasing productivity (EP 252705, EP 050021 and U.S. Pat. No. 4,350, 835) and modification of the system by introducing gallium (EP 120018 and EP 184927). Especially, EP 252705 discloses a zeolite-containing catalyst with a constraint index of 1-12, preferably the catalyst having a very high ratio of silica/alumina and containing 0.5-10% of gallium, and other elements that belong to Group VIII metals may also exist.

Like lots of organic catalytic reactions, there exists a problem for the catalyst used in aromatization reactions of decrease in catalyst activity resulting from carbon deposition on the catalyst surface, which requires frequent regeneration of the catalyst and thus causes many difficulties in industrial fixed-bed operations. Therefore, increasing carbon deposition resistance of the catalyst, improving catalyst stability and thus elongating reaction cycle and catalyst lifetime are the key to whether it can be industrially employed.

CN 1081938A discloses a process for modifying the aromatization catalyst by activating, wherein Zn/HZSM-5 type catalyst is activated with water vapor at an elevated temperature, and when the catalyst is used in the aomatization of pyrolytic gasoline, the catalyst lifetime is improved. However, the best result of lifetime obtained is only 29 hrs in a single pass. There is no mention of use in even lower hydrocarbons in the patent. CN 86 108104A and U.S. Pat. No. 4,636,483 of US Global Corporation disclose a composite catalyst that can be used for production of $C_2$-$C_5$ hydrocarbons with good anti-coking effect and an extended catalyst lifetime, wherein a main way is to improve the preparation of carrier by incorporating phorsphor-containing alimina into the crystalline silicate zeolite, dispersing the resultant material into microspheres in an elevated temperature oil, but the preparation process is complicated. CN 106200A discloses HZSM-5 and HZSM-11 zeolite catalysts modified with Zn—Pt and Ga—Pt respectively for aromatizing light hydrocarbons. But they are limited only to use with light hydrocarbon fractions having higher carbon number ($C_4$-$C_9$) from oil fields, and noble metal Pt is used and results in higher cost. U.S. Pat. No. 4,180,689 and U.S. Pat. No. 4,334,114 disclose Ga/HZSM-5 catalyst that is used in aromatization of $C_3$-$C_{12}$ hydrocarbons, aiming at modifying activity of the catalyst and selectivity of aromatics, but no problems on the carbon deposition resistance and stability of catalyst are involved. U.S. Pat. No. 4,157,293 patent describes in detail a HZSM-5 molecular sieve catalyst carrying zinc and incorporating a given amount of other elements, and the problem on decreasing activity of the aromatization catalyst due to loss of zinc during the reaction has been solved. It is pointed out in the document that a metal to be introduced is a metal of Group IB and Group VIII, and that germanium, rhenium, or a rare earth metal may also be added.

In the patents (U.S. Pat. No. 4,407,728 and EP 215579, EP 216491, EP 224162 and EP 228267), it has been found that the selectivity for aromatic compounds can be improved by adding platinum and palladium to the Ga and MFI-zeolite based catalyst, and carbon deposition can be inhibited on catalyst surface. However, the existence of these metals will enhance the formation of methane and ethane due to cracking. Later, it was discovered in research that the selectivity for aromatic compound can be further increased by introducing rhenium in the presence of platinum or palladium, but the quantity of $C_1$-$C_2$ lower alkanes in the product is also increased (U.S. Pat. No. 4,766,265). When the catalytic composition that contains copper or chromium and a MFI zeolite is used, fewer amount of methane can be formed, but the selectivity for aromatic compounds is less than that obtained by using a catalytic composition that contains gallium and a MFI zeolite (see P. Meriaudeau Zeolites: Facts, Figures, Future, 1423-1429, 1989; E. S. Shapiro, International Symposium on Zeolites as Catalysts, Sorbents and Detergent Builders RFA, 73, 1988). EP 474536 discloses a catalyst that contains a MFI zeolite, a platinum series of noble metal, a metal selected from the group consisting of Sn, Ge, In and Pb, an alkali metal and/or an alkali-earth metal component, which catalyst system improves the selectivity of aromatic compounds.

An elevated temperature required for the aromatization reaction of olefins and lower alkanes results in very short lifetime of the catalyst, because a phenomenon of severe coking and blocking occurs in the inner pores of the catalyst, which are closely related to cracking or polycondensation of the compounds in this reaction environment. CN 1284405A discloses a catalytic composition that contains gallium, at least one element selected from the group consisting of lanthanide series and a zeolite selected from the group consisting of MFI, MEL or MFI/MEL type zeolites. This catalyst system can result in higher selectivity of the aromatization of $C_3$-$C_6$ lower hydrocarbons than other catalytic system, especially the catalyst based on gallium and a MFI zeolite, and exhibits better resistance of deactivation, and as a result, elongates considerably lifetime.

Up to now, no report has been found that the molecular sieve having a MFI structure is modified simultaneously with both phosphorus and two metal elements.

CONTENT OF THE INVENTION

An object of the present invention is to provide a MFI-structured molecular sieve that is modified simultaneously with both phosphorus and two metal elements. The molecular sieve as a shape-selective active component of the catalyst for catalytic cracking reaction can increase yield of lower olefins in gas products whilst increasing aromatics content in gasoline, increasing gasoline octane number, and exhibiting excellent performance of carbon deposition resistance and activity stability.

The MFI-structured molecular sieve containing phosphorus and metal components according to the present invention has a formula expressed in an anhydrous form and on the basis of oxide weight: (0~0.3) $Na_2O$ (0.5~5.5) $Al_2O_3$ (1.3~10) $P_2O_5$ (0.7~15) $M1_xO_y$ (0.01~5) $M2_mO_n$ (70-97) $SiO_2$, wherein M1 is one of metals selected from the group consisting of Fe, Co and Ni, x represents the number of atoms of M1, y represents a number required by the oxidation state of M1, M2 is one of metals selected from the group consisting of Zn, Mn, Ga and Sn, m represents the number of atoms of M2, and n represents a number required by the oxidation state of M2.

Since metal elements of M1 and M2 are different in category, the values taken respectively for x, y, m and n are also different in the formulae of their oxides. For example, said metal oxides include, but not limited to $Fe_2O_3$, $Co_2O_3$, $Ni_2O_3$, ZnO, $Mn_2O_3$, $Ga_2O_3$, $SnO_2$ and the like.

In said MFI-structured molecular sieves according to the present invention, preferably M1 is Fe and M2 is Zn, more preferably M1 is Fe while M2 is Zn; said MFI-structured molecular sieve is ZSM-5 or zeolites that belong to the same category of MFI structure, said zeolites that belong to the same category of MFI structure as the ZSM-5 have been disclosed in documents such as CN 1052290A, CN 1058382A, CN 1147420A, CN 1194181A and the like.

The molecular sieve according to the present invention has a formula expressed in an anhydrous form and on the basis of oxides weight as follows: $(0-0.2)Na_2O(0.9\sim5.0)Al_2O_3$ $(1.5\sim7)P_2O_5(0.9\sim10)M1_xO_y(0.5\sim2)$ $M2_mO_n(82\sim92)$ $SiO_2$.

The process for preparing the MFI-structured molecular sieve according to the present invention comprises the steps of: ammonium-exchanging, phosphorus-modifying, modifying with two metal components, and calcination treatment. More particularly, the Na-type molecular sieve having MFI structure that is obtained by conventional crystallization is ion-exchanged in a weight ratio of molecular sieve:ammonium salt:$H_2O$=1:(0.1~1):(5~10) at a temperature from room temperature to 100° C. for 0.3~1 hours, and then filtered, and the filtered molecular sieve is modified by introducing phosphorus and one of metals selected from the group consisting of Fe, Co, Ni and any one of metals selected from the group consisting of Zn, Mn, Ga and Sn, and then calcined at 400~800° C. for 0.5~8 hrs, wherein said calcining step may be also one carried out under a water vapor atmosphere.

During the preparation of the MFI-structured molecular sieve according to the present invention, if said Na-type molecular sieve having MFI structure is synthesized by using an organic template agent, the aforementioned operation should be carried out after removing the template agent, wherein said ammonium salt is common inorganic ammonium salt that may be one selected from the group consisting of ammonium chloride, ammonium sulfate or ammonium nitrate, or mixtures thereof.

During the preparation of the MFI-structured molecular sieve according to the present invention, modifying the molecular sieve with said phosphorus and one of metals selected from Fe, Co and Ni and any one of metals selected from Zn, Mn, Ga and Sn can be carried out by impregnating or ion-exchanging.

Here, said impregnating step may be further carried out in five modes as follows:

a. Stiring homogeneously the ammonium-exchanged filter cake with an aqueous solution having a calculated amount of a phosphorus-containing compound at a temperature from room temperature to 95° C., oven-drying the resultant slurry, calcining the dried solid at 400~800° C., and then mixing homogeneously the calcined solid with an aqueous solution having a calculated amount of compounds containing one of metals selected from Fe, Co and Ni and one of metals selected from Zn, Mn Ga and Sn at a temperature from room temperature to 95° C., and oven-drying the resultant mixture.

b. Stiring homogeneously the ammonium-exchanged filter cake with an aqueous solution having a calculated amount of a phosphorus-containing compound at a temperature from room temperature to 95° C., oven-drying the resultant slurry, calcining the dried solid at 400~800° C., then mixing homogeneously the calcined solid with an aqueous solution having a calculated amount of a compound containing one of metals selected from Fe, Co and Ni at a temperature from room temperature to 95° C., oven-drying again the resultant mixture, calcining the dried solid at 400~800° C., and finally mixing homogeneously further the calcined solid with an aqueous solution having a calculated amount of a compound containing one of metals selected from Zn, Mn, Ga and Sn at a temperature from room temperature to 95° C., and then oven-drying the resultant mixture, wherein the two metal components to be supported may be also added in a reversed sequence.

c. Stiring homogeneously the ammonium-exchanged filter cake with an aqueous solution having a calculated amount of a phosphorus-containing compound at a temperature from room temperature to 95° C., oven-drying the resultant slurry, then mixing homogeneously the dried solid with an aqueous solution having a calculated amount of compounds containing one of metals selected from Fe, Co and Ni and one of metals selected from Zn, Mn Ga and Sn at a temperature from room temperature to 95° C., and then oven-drying the resultant mixture, wherein the two solutions mentioned above may also be used for impregnating in a reversed sequence.

d. Stiring homogeneously the ammonium-exchanged filter cake with an aqueous solution having a calculated amount of a phosphorus-containing compound at a temperature from room temperature to 95° C., oven-drying the resultant slurry, then mixing homogeneously the dried solid with an aqueous solution having a calculated amount of a compound containing one of metals selected from Fe, Co and Ni, oven-drying the resultant mixture, and finally mixing homogeneously further the dried solid with a calculated amount of an aqueous solution of a compound containing one of metals selected from Zn, Mn, Ga and Sn at a temperature from room temperature to 95° C., and then oven-drying the resultant mixture, wherein the two solutions mentioned above may also be used for impregnating in a reversed sequence.

e. Mixing homogeneously the ammonium-exchanged filter cake with a mixed water solution having a calculated amount of a phosphorus-containing compound and the compounds containing one of metals selected from Fe, Co and Ni and one of metals selected from Zn, Mn, Ga and Sn at a temperature from room temperature to 95° C., and then oven-drying the resultant mixture.

Said ion-exchange is carried out by stiring homogeneously said ammonium-exchanged filter cake with an aqueous solution having a calculated amount of a phosphorus-containing compound at a temperature from room temperature to 95° C., oven-drying the resultant slurry, calcining the dried solid at 400~800° C., and after mixing homogeneously the calcined solid with an aqueous solution having a calculated amount of compounds containing one of metals selected from Fe, Co and Ni and one of metals selected from Zn, Mn, Ga and Sn in a ratio of solid:liquid=1:(5~20), stirring the resultant mixture at 80~95° C. and pH 4~7 for 2~3 hours and then filtering the mixture, wherein the ion-exchange may be repeated for many times, and the exchanged sample may be washed with water for many times before oven-drying the washed sample.

During the preparation of the MFI-structured molecular sieve according to the present invention, said phosphorus-containing compound is one selected from the group consisting of phosphoric acid, ammonium hydrogen phosphate, ammonium dihydrogen phosphate or ammonium phosphate or a mixture thereof.

During the preparation of the MFI-structured molecular sieve according to the present invention, said Fe, Co and Ni compounds and Zn, Mn, Ga and Sn compounds are those selected from their water soluble salts that are one selected from sulfate, nitrate and chloride salt.

For the MFI-structured molecular sieve containing phosphorus and two metal components according to the present invention, its acid sites bond tightly with dehydrogenation sites on metals and further existence of phosphorus can not only improve structural stability of the molecular sieve, but also poison partially the dehydrogen ability of metals. In the catalytic cracking process of petroleum hydrocarbons, the synergy of different active sites of this molecular sieve can result in higher yield of liquefied petroleum gas, especially further increasing the yields of $C_2$~$C_4$ olefins and selectivity while the yield of dry gas only in a less extent, as compared with those in the prior art, and in the meantime enhancing aromatization ability of the molecular sieve, thus increasing the aromatics content in gasoline and increasing the gasoline octane number. Furthermore, because of addition of metals, the surface acidity of the catalyst is adjusted and changed, porous channels of molecular sieve is further narrowed, the formation of coking precursor is inhibited, thereby the objects for decreasing quantity of carbon deposition and improving stability are realized.

The molecular sieve according to the present invention can be used as a shape-selective active component of catalytic cracking catalyst or additive in an amount from 1 to 50% by weight of the catalyst or additive. As compared with the reference catalyst (Example 13), for example, when the cracking catalyst that consists of 20 wt % ultra-stable Y-molecular sieve, 30 wt % of a binder, 35 wt % of a carrier and 15 wt % of the MFI-structured molecular sieve according to the present invention is used, the yield of lower olefins increases remarkably due to increase in selectivity of lower olefins and the yield of liquefied petroleum gas, in the meantime the aromatics content in gasoline is further increased by 4 percents, exhibiting excellent performance in increasing yield of lower olefins and enhancing aromatics content in gasoline.

MODES OF CARRYING OUT THE INVENTION

The present invention will be further illustrated by the following examples, but not limited thereto.

In each of the Examples and Comparative Examples, the amounts of $Na_2O$, $Fe_2O_3$, $Co_2O_3$, $Ni_2O_3$, ZnO, $Mn_2O_3$, $Ga_2O_3$, $SnO_2$, $Al_2O_3$, $SiO_2$ in the product molecular sieves are measured by X-ray fluorescence method (see, "Analytic Methods in Petrochemical Engineering (Experimental Methods for RIPP", Ed. by Yang Cuiding et al., Science Press, 1990).

Example 1

20 g $NH_4Cl$ was dissolved in 1000 g water, and 100 g crystallized product of ZSM-5 molecular sieve (dry basis) (manufactured by non-amine syntheses, $SiO_2/Al_2O_3$=30, Changling Catalyst Factory) was added to the resultant solution, and ion-exchanged with the solution at 90° C. for 0.5 h, and then filtered to obtain a filter cake; 2.0 g $H_3PO_4$ (a concentration of 85%) and 1.5 g $Fe(NO_3)_3$, 1.2 g $Zn(NO_3)_2$ dissolved in 90 g water were added, and the filter cake was mixed and impregnated with the resultant solution, and then oven-dried; the sample obtained was calcined at 550° C. for 2 hrs to obtain the molecular sieve according to the present invention. Chemical composition obtained by elementary analysis is as follows:

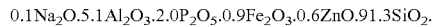

Example 2

20 g $NH_4Cl$ was dissolved in 1000 g water, and 100 g crystallized product of ZSM-5 molecular sieve (dry basis) (manufactured by non-amine synthesis, $SiO_2/Al_2O_3$=30, Changling Catalyst Factory) was added to the resultant solution, and ion-exchanged with the solution at 90° C. for 0.5 h, and then filtered to obtain a filter cake; 2.0 g $H_3PO_4$ (a concentration of 85%) and 1.5 g $FeCl_3$, 0.8 g $ZnCl_2$ dissolved in 90 g water were added, and the filter cake was mixed and impregnated with the obtained solution, and then oven-dried; the sample obtained was calcined at 550° C. for 2 hrs to obtain the molecular sieve according to the present invention. Chemical composition obtained by elementary analysis is as follows:

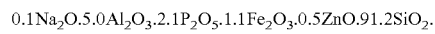

Example 3

50 g $NH_4Cl$ was dissolved in 1000 g water, and 100 g crystallized product of ZSM-5 molecular sieve (dry basis) (manufactured by amine synthesis, $SiO_2/Al_2O_3$=70, Changling Catalyst Factory) was added to the resultant solution and ion-exchanged with the solution at 85° C. for 0.5 h, and then filtered to obtain a filter cake; 8.0 g $NH_4H_2PO_4$ was dissolved in 60 g water, and the filter cake was mixed and impregnated with the obtained solution, and then oven-dried, and the obtained sample was calcined at 550° C. for 2 hrs; the aforesaid sample was ion-exchanged in a solid/liquid ratio of 1:5 with a mixed solution having a concentration of 6% $Fe(NO_3)_3$ and a concentration of 3.1% $Zn(NO_3)_2$ at 80~90° C. for 2 hrs, and then filtered, and the ion-exchange was further repeated for several times till a desired amount exchanged, and then the ion-exchanged sample was calcined at 550° C. for 2 hrs to obtain the molecular sieve according to the present invention. Chemical composition obtained by elementary analysis is as follows:

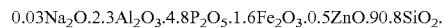

Example 4

50 g $NH_4Cl$ was dissolved in 1000 g water, and 100 g crystallized product of ZSM-5 molecular sieve (dry basis) (manufactured by amine synthesis, $SiO_2/Al_2O_3$=70, Changling Catalyst Factory) was added to the resultant solution, and then ion-exchanged with the solution at 85° C. for 0.5 h, and filtered to obtain a filter cake; 8.0 g $NH_4H_2PO_4$ was dissolved in 60 g water, and the filter cake was mixed and impregnated with the obtained solution, and then oven-dried, and the sample obtained was calcined at 550° C. for 2 hrs; the aforesaid sample was ion-exchanged with a 5% $Fe(NO_3)_3$ solution in a solid/liquid ratio of 1:5 at 80~90° C. for 2 hrs and filtered, and then further repeated the ion-exchange for several times till to reach a desired amount for ion-exchanging, and the ion-exchanged sample was calcined at 550° C. for 2 hrs; and the calcined sample was ion-exchanged with a 5% $Zn(NO_3)_3$ solution in a solid/liquid ratio of 1:5 at 80~90° C. for 2 hrs, and filtered, and then the ion-exchange was further repeated for several times till a desired amount exchanged, and then the ion-exchanged sample was calcined at 550° C. for 2 hrs to obtain the molecular sieve according to the present invention. Chemical composition obtained by elementary analysis is as follows:

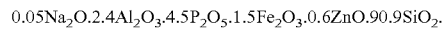

Example 5

80 g $NH_4Cl$ was dissolved in 1000 g water, and 100 g crystallized product of ZSM-5 molecular sieve (dry basis) (manufactured by amine synthesis, $SiO_2/Al_2O_3$=170, Changling Catalyst Factory) was added to the resultant solution, and then ion-exchanged with the solution at 85° C. for 0.5 h, and filtered to obtain a filter cake; 8.9 g $NH_4H_2PO_4$ was dissolved in 60 g water, and the filter cake was mixed and impregnated with the obtained solution, and then oven-dried; and 31.9 g $FeSO_4 \cdot 6H_2O$ and 6 g $ZnSO_4$ were dissolved in 90 g water, and the aforementioned sample was mixed and impregnated with the obtained solution, and then oven-dried: the dried sample was calcined at 600° C. for 2 hrs to obtain the molecular sieve according to the present invention. Chemical composition obtained by elementary analysis is as follows:

$$0.1Na_2O \cdot 0.8Al_2O_3 \cdot 5.0P_2O_5 \cdot 10.1Fe_2O_3 \cdot 3ZnO \cdot 81.0SiO_2.$$

Example 6

60 g NH₄Cl was dissolved in 1000 g water, and 100 g crystallized product of ZSM-5 molecular sieve (dry basis) (manufactured by amine synthesis, SiO₂/Al₂O₃=50, Changling Catalyst Factory) was added to the resultant solution, and then ion-exchanged with the solution at 85° C. for 0.5 h, and filtered to obtain a filter cake; 6.2 g NH₄H₂PO₄ was dissolved in 60 g water, and the filter cake was mixed and impregnated with the obtained solution, and then oven-dried; and 7.6 g Fe(NO₃)₃.9H₂O was dissolved in 90 g water, and the aforementioned sample was mixed and impregnated with the obtained solution, and then oven-dried the dried sample was calcined at 600° C. for 2 hrs; and 1.6 g ZnCl₂ was dissolved in 90 g water, and the aforementioned sample was mixed and impregnated with the obtained solution, and then oven-dried: the dried sample was calcined at 600° C. for 2 hrs to obtain the molecular sieve according to the present invention. Chemical composition obtained by elementary analysis is as follows:

$$0.1Na_2O \cdot 3.1Al_2O_3 \cdot 3.5P_2O_5 \cdot 1.4Fe_2O_3 \cdot 1.1ZnO \cdot 90.8SiO_2.$$

Example 7

50 g (NH₄)₂SO₄ was dissolved in 1000 g water, and 100 g crystallized product of ZSM-5 molecular sieve (dry basis) (manufactured by non-amine synthesis, SiO₂/Al₂O₃=30, Changling Catalyst Factory) was added to the resultant solution, and then ion-exchanged with the solution at 85° C. for 0.5 h, and filtered to obtain a filter cake; 7.8 g NH₄H₂PO₄ was dissolved in 60 g water, and the filter cake was mixed and impregnated with the obtained solution, and then oven-dried; and 7.6 g Fe(NO₃)₃.9H₂O and 4.6 g Mn(NO₃)₂ (a concentration of 50%) were dissolved in 90 g water, and the aforementioned sample was mixed and impregnated with the resultant solution, and then oven-dried: the dried sample was calcined at 550° C. for 2 hrs to obtain the molecular sieve according to the present invention. Chemical composition obtained by elementary analysis is as follows:

$$0.03Na_2O \cdot 4.9Al_2O_3 \cdot 4.5P_2O_5 \cdot 1.5Fe_2O_3 \cdot 1.1Mn_2O_3 \cdot 88.0SiO_2.$$

Example 8

50 g (NH₄)₂SO₄ was dissolved in 1000 g water, and 100 g crystallized product of ZSM-5 molecular sieve (dry basis) (manufactured by non-amine synthesis, SiO₂/Al₂O₃=30, Changling Catalyst Factory) was added to the resultant solution, and then ion-exchanged with the solution at 85° C. for 0.5 h, and filtered to obtain a filter cake; 7.8 g NH₄H₂PO₄ was dissolved in 60 g water, and the filter cake was mixed and impregnated with the obtained solution, and then oven-dried; and 13.9 g Co(NO₃)₂.6H₂O and 4.6 g Mn(NO₃)₂ (a concentration of 50%) were dissolved in 90 g water, and the aforementioned sample was mixed and impregnated with the obtained solution, and then oven-dried: the obtained sample was calcined at 550° C. for 2 hrs to obtain the molecular sieve according to the present invention. Chemical composition obtained by elementary analysis is as follows:

$$0.03Na_2O \cdot 4.8Al_2O_3 \cdot 4.5P_2O_5 \cdot 3.5Co_2O_3 \cdot 1.1Mn_2O_3 \cdot 86.1SiO_2.$$

Example 9

50 g (NH₄)₂SO₄ was dissolved in 1000 g water, and 100 g crystallized product of ZSM-5 molecular sieve (dry basis) (manufactured by non-amine synthesis, SiO₂/Al₂O₃=30, Changling Catalyst Factory) was added to the resultant solution, and then ion-exchanged with the solution at 85° C. for 0.5 h, and filtered to obtain a filter cake; 8.6 g (NH₄)₂HPO₄ was dissolved in 60 g water, and the filter cake was mixed and impregnated with the obtained solution, and then oven-dried; and 7.5 g Ni(NO₃)₂.6H₂O and 4.6 g Mn(NO₃)₂ (a concentration of 50%) were dissolved in 90 g water, and the aforementioned sample was mixed and impregnated with the obtained solution, and then oven-dried: the obtained sample was calcined at 600° C. for 2 hrs to obtain the molecular sieve according to the present invention. Chemical composition obtained by elementary analysis is as follows:

$$0.1Na_2O \cdot 4.9Al_2O_3 \cdot 4.5P_2O_5 \cdot 2.0Ni_2O_3 \cdot 1.0Mn_2O_3 \cdot 87.5SiO_2.$$

Example 10

50 g (NH₄)₂SO₄ was dissolved in 1000 g water, and 100 g crystallized product of ZSM-5 molecular sieve (dry basis) (manufactured by non-amine synthesis, SiO₂/Al₂O₃=30, Changling Catalyst Factory) was added to the resultant solution, and then ion-exchanged with the solution at 85° C. for 0.5 h, and filtered to obtain a filter cake; 8.6 g (NH₄)₂HPO₄ was dissolved in 60 g water, and the filter cake was mixed and impregnated with the obtained solution, and then oven-dried: and 7.6 g Fe(NO₃)₃.9H₂O and 4.4 g Ga(NO₃)₃.9H₂O were dissolved in 90 g water, and the aforementioned sample was mixed and impregnated with the obtained solution, and then oven-dried, the obtained sample was calcined at 600° C. for 2 hrs to obtain the molecular sieve according to the present invention. Chemical composition obtained by elementary analysis is as follows:

$$0.1Na_2O \cdot 5.0Al_2O_3 \cdot 4.5P_2O_5 \cdot 1.6Fe_2O_3 \cdot 1.1Ga_2O_3 \cdot 87.7SiO_2.$$

Example 11

50 g (NH₄)₂SO₄ was dissolved in 1000 g water, and 100 g crystallized product of ZSM-5 molecular sieve (dry basis) (manufactured by non-amine synthesis, SiO₂/Al₂O₃=30, Changling Catalyst Factory) was added to the resultant solution, and then ion-exchanged with the solution at 85 for 0.5 h, and filtered to obtain a filter cake; 8.6 g (NH₄)₂HPO₄ was dissolved in 60 g water, and the filter cake was mixed and impregnated with the obtained solution, and then oven-dried; and 7.6 g Fe(NO₃)₃.9H₂O and 2.4 g SnCl₄.5H₂O were dissolved in 90 g water, and the aforementioned sample was mixed and impregnated with the obtained solution, and then oven-dried: the obtained sample was calcined at 600° C. for 2 hrs to obtain the molecular sieve according to the present invention. Chemical composition obtained by elementary analysis is as follows:

$$0.2Na_2O \cdot 5.0Al_2O_3 \cdot 4.5P_2O_5 \cdot 1.6Fe_2O_3 \cdot 1.0SnO_2 \cdot 87.7SiO_2.$$

Example 12

50 g (NH₄)₂SO₄ was dissolved in 1000 g water, and 100 g crystallized product of ZSM-5 molecular sieve (dry basis) (manufactured by non-amine synthesis, SiO₂/Al₂O₃=30, Changling Catalyst Factory) was added to the resultant solution, and then ion-exchanged with the solution at 85° C. for 0.5 h, and filtered to obtain a filter cake; 7.8 g (NH₄)₂H₂PO₄ was dissolved in 60 g water, and the filter cake was mixed and impregnated with the obtained solution, and then oven-dried; and 7.6 g Fe(NO₃)₃.9H₂O and 1.6 g ZnCl₂ were dissolved in 90 g water, and the aforementioned sample was mixed and impregnated with the resultant solution, and then oven-dried;

the obtained sample was calcined at 550° C. for 2 hrs to obtain the molecular sieve according to the present invention. Chemical composition obtained by elementary analysis is as follows:

$$0.05Na_2O.4.9Al_2O_3.4.5P_2O_5.1.5Fe_2O_3.1.1ZnO.88.0SiO_2.$$

Comparative Example 1

A phosphorus-modified ZSM-5 molecular sieve was prepared according to U.S. Pat. No. 5,472,594.

20 g NH$_4$Cl was dissolved in 1000 g water, and 100 g crystallized product of ZSM-5 molecular sieve (dry basis) (manufactured by Changling Catalyst Factory) SiO$_2$/Al$_2$O$_3$=70) was added to the resultant solution, and then ion-exchanged with the solution at 90° C. for 0.5 h, and then filtered to obtain a filter cake; the filter cake was added with 3.4 g H$_3$PO$_4$ (a concentration of 85%) and stirred at room temperature for 0.5 hrs, and then oven-dried; the product obtained was calcined at 500° C. for 1 hrs to obtain the molecular sieve provided by the present invention. Chemical composition obtained by elementary analysis is as follows:

$$0.1Na_2O.2.3Al_2O_3.2.1P_2O_5.95.5SiO_2.$$

Comparative Example 2

In this Comparative Example, a phosphorus- and ferri-modified ZSM-5 molecular sieve was prepared.

50 g (NH$_4$)$_2$SO$_4$ was dissolved in 1000 g water, and 100 g crystallized product of ZSM-5 molecular sieve (dry basis) (manufactured by non-amine synthesis, SiO$_2$/Al$_2$O$_3$=30, Changling Catalyst Factory) was added to the resultant solution, and ion-exchanged with the solution at 85° C. for 0.5 h, and then filtered to obtain a filter cake; 8.6 g (NH$_4$)$_2$HPO$_4$ was dissolved in 60 g water, and the filter cake was mixed and impregnated with the obtained solution, and then oven-dried; and 7.6 g Fe(NO$_3$)$_3$.9H$_2$O was added to and dissolved in 90 g water, and the aforementioned sample was mixed and impregnated with the resultant solution, and then oven-dried; the dried sample was calcined at 600° C. for 2 hrs to obtain the molecular sieve provided by the present invention. Chemical composition obtained by elementary analysis is as follows:

$$0.1Na_2O.5.0Al_2O_3.4.5P_2O_5.1.5Fe_2O_3.88.9SiO_2.$$

Comparative Example 3

In this Comparative Example, a phosphorus- and zinc-modified ZSM-5 molecular sieve was prepared.

50 g (NH$_4$)$_2$SO$_4$ was dissolved in 1000 g water, and 100 g crystallized product of ZSM-5 molecular sieve (dry basis) (manufactured by non-amine synthesis, SiO$_2$/Al$_2$O$_3$=30, Changling Catalyst Factory) was added to the resultant solution, and ion-exchanged with the solution at 85° C. for 0.5 h, and then filtered to obtain a filter cake; 8.6 g (NH$_4$)$_2$HPO$_4$ was dissolved in 60 g water, and the filter cake was mixed and impregnated with the obtained solution, and then oven-dried; and 2.4 g ZnCl$_2$ was added to and dissolved in 90 g water, and the aforementioned sample was mixed and impregnated with the resultant solution, and then oven-dried; the obtained sample was calcined at 600° C. for 2 hrs to obtain the molecular sieve provided by the present invention. Chemical composition obtained by elementary analysis is as follows:

$$0.15Na_2O.4.9Al_2O_3.4.5P_2O_5.1.6ZnO.88.9SiO_2.$$

Comparative Example 4

In this Comparative Example, a ferri- and zinc-modified ZSM-5 molecular sieve was prepared.

50 g (NH$_4$)$_2$SO$_4$ was dissolved in 1000 g water, and 100 g crystallized product of ZSM-5 molecular sieve (dry basis) (manufactured by non-amine synthesis, SiO$_2$/Al$_2$O$_3$=30, Changling Catalyst Factory) was added to the resultant solution, and then ion-exchanged with the solution at 85° C. for 0.5 h, and filtered to obtain a filter cake; 7.6 g Fe(NO$_3$)$_3$.9H$_2$O and 1.6 g ZnCl$_2$ were dissolved in 90 g water, and the filter cake was mixed and impregnated with the obtained solution, and then oven-dried; the obtained sample was calcined at 600° C. for 2 hrs to obtain the molecular sieve provided by the present invention. Chemical composition obtained by elementary analysis is as follows:

$$0.15Na_2O.5.1Al_2O_3.1.5Fe_2O_3.1.1ZnO.92.2SiO_2.$$

Comparative Example 5

In this Comparative Example, a phosphorus-, zinc- and rare earth-modified ZSM-5 molecular sieve was prepared.

50 g (NH$_4$)$_2$SO$_4$ was dissolved in 1000 g water, and 100 g crystallized product of ZSM-5 molecular sieve (dry basis) (manufactured by non-amine synthesis, SiO$_2$/Al$_2$O$_3$=30, Changling Catalyst Factory) was added to the resultant solution, and ion-exchanged with the solution at 85° C. for 0.5 h, and then filtered to obtain a filter cake; 6.9 g (NH$_4$)$_2$HPO$_4$ was dissolved in 60 g water, and the filter cake was mixed and impregnated with the obtained solution, and then oven-dried; 2.6 g ZnCl$_2$ and 56 ml of norium chloride solution having a concentration of 100 g RE$_2$O$_3$/l were dissolved in 90 g water, and the aforementioned sample was mixed and impregnated with the obtained solution, and then oven-dried; the obtained sample was calcined at 600° C. for 2 hrs to obtain the molecular sieve according to the present invention. Chemical composition obtained by elementary analysis is as follows:

$$0.1Na_2O.4.6Al_2O_3.3.6P_2O_5.1.7ZnO.5.4RE_2O_3.84.6SiO_2.$$

Example 13

The present Example is to illustrate the evaluation test used for the molecular sieves provided by the present invention.

The samples prepared in the aforementioned Examples and Comparative Examples were aged respectively in a fixed-bed aging apparatus with 100% water vapor at 800° for 4 hrs, and then pelletized and screen-fractionated into granules with 20-40 mesh. An commercial equilibrium catalyst of the DOCP catalyst (manufactured by Changling Catalyst Factory) used as a base catalyst was blended homogeneously and respectively with each of the molecular sieves in a weight ratio of 95:5, and then the resultant blends were evaluated respectively in a micro reaction apparatus for catalytic cracking of heavy oils under the conditions as follows: a reaction temperature of 500° C., a regeneration temperature of 600° C., a catalyst/oil ratio of 4 and a catalyst inventory of 5 g. The PONA analysis of gasoline in the product collected after the evaluation was measured by chromatography. Properties of the feedstock oil are shown in Table 1. Evaluation results are shown in Table 2.

TABLE 1

| Item | Analytical data |
| --- | --- |
| Density (20° C.) (g/cm$^3$) | 0.8731 |
| Refractive index (70° C.) | 1.4682 |
| Viscosity (80° C.)/mm$^2$/s | 17.56 |
| Vacuum distillation range/° C. | |
| Initial point | 189 |
| 5% | 398 |
| 10% | 418 |
| 30% | 457 |
| 50% | 497 |
| 70% | 549 |
| 90% | 73.5%, 560° C. |
| Acid value/mg KOH/g | 0.07 |
| Carbon residue/% | 0.7 |
| Ash/% | 0.05 |
| S content/% | 0.12 |
| N content/% | 0.11 |
| C, H content/%: | |
| C | 86.43 |
| H | 13.53 |

TABLE 2

| | | Example Nos. | | | | | | | | | |
| --- | --- | --- | --- | --- | --- | --- | --- | --- | --- | --- | --- |
| | | 1 | 2 | 3 | 4 | 5 | 6 | 7 | 8 | 9 | 10 |
| Material balance/m % | Dry gas | 2.89 | 2.82 | 2.41 | 2.52 | 2.12 | 2.62 | 3.07 | 2.01 | 3.09 | 3.05 |
| | LPG | 35.14 | 34.54 | 32.60 | 34.23 | 31.43 | 33.54 | 35.78 | 30.89 | 33.23 | 33.98 |
| | gasoline | 37.87 | 38.50 | 41.09 | 39.06 | 41.64 | 40.19 | 37.83 | 40.29 | 38.58 | 38.43 |
| | diesel | 10.72 | 11.01 | 11.19 | 11.27 | 11.75 | 11.01 | 10.50 | 11.98 | 11.54 | 10.45 |
| | Heavy oil | 11.20 | 10.90 | 10.50 | 10.75 | 10.01 | 10.40 | 10.80 | 11.82 | 10.67 | 11.11 |
| | coke | 2.18 | 2.23 | 2.21 | 2.17 | 3.05 | 2.23 | 2.02 | 3.01 | 2.89 | 2.98 |
| Conversion/m % | | 78.08 | 78.09 | 77.31 | 77.98 | 78.24 | 78.59 | 78.70 | 76.20 | 77.79 | 78.44 |
| $C_2^=/C_2$, in total | | 0.76 | 0.75 | 0.74 | 0.73 | 0.71 | 0.75 | 0.81 | 0.70 | 0.72 | 0.71 |
| Propylene, m % | | 11.52 | 10.99 | 10.85 | 11.13 | 10.23 | 10.90 | 12.54 | 9.95 | 11.24 | 11.02 |
| Total butene, m % | | 10.24 | 10.17 | 9.69 | 10.08 | 9.57 | 9.77 | 11.08 | 9.38 | 9.98 | 9.58 |
| Isobutylene, m % | | 4.22 | 4.18 | 3.89 | 4.13 | 3.75 | 3.98 | 4.63 | 3.54 | 4.11 | 4.01 |
| Gasoline composition/m % | n-alkanes | 5.21 | 5.16 | 4.98 | 4.96 | 4.91 | 4.86 | 4.89 | 4.9 | 4.62 | 4.95 |
| | isoalkanes | 39.39 | 39.57 | 39.91 | 39.48 | 38.87 | 38.62 | 38.93 | 38.59 | 39.33 | 39.71 |
| | olefins | 26.82 | 27.23 | 26.12 | 26.95 | 28.14 | 28.81 | 28.1 | 28.62 | 27.85 | 27.16 |
| | cycloparaffins | 8.23 | 8.03 | 8.07 | 8.32 | 8.45 | 8.36 | 8.46 | 8.41 | 8.35 | 8.16 |
| | aromatics | 20.35 | 20.01 | 20.92 | 20.29 | 19.63 | 19.35 | 19.62 | 19.48 | 19.85 | 20.02 |

| | | Example Nos. | | | | | | |
| --- | --- | --- | --- | --- | --- | --- | --- | --- |
| | | 11 | 12 | Comp. Exp. 1 | Comp, Exp. 2 | Comp, Exp. 3 | Comp, Exp. 4 | Comp, Exp. 5 |
| Material balance/m % | Dry gas | 2.98 | 2.88 | 1.84 | 2.03 | 1.88 | 1.65 | 1.93 |
| | LPG | 32.81 | 34.66 | 26.51 | 33.85 | 30.26 | 30.49 | 32.24 |
| | gasoline | 39.55 | 38.67 | 45.12 | 42.14 | 44.83 | 36.01 | 40.23 |
| | diesel | 11.63 | 10.85 | 12.96 | 10.96 | 11.45 | 14.36 | 12.24 |
| | Heavy oil | 10.98 | 10.63 | 10.95 | 8.87 | 8.66 | 15.48 | 10.23 |
| | coke | 2.05 | 2.31 | 2.62 | 2.15 | 2.92 | 2.01 | 3.13 |
| Conversion/m % | | 77.39 | 78.52 | 76.09 | 80.17 | 79.89 | 70.16 | 77.53 |
| $C_2^=/C_2$, in total | | 0.72 | 0.78 | 0.62 | 0.78 | 0.61 | 0.78 | 0.63 |
| Propylene, m % | | 11.89 | 11.95 | 7.67 | 11.65 | 8.15 | 10.25 | 9.84 |
| Total butene, m % | | 9.87 | 10.67 | 6.72 | 10.15 | 7.85 | 8.89 | 9.13 |
| Isobutylene, m % | | 4.15 | 4.40 | 2.31 | 4.07 | 2.75 | 3.98 | 3.96 |
| Gasoline composition/m % | n-alkanes | 4.58 | 4.87 | 4.02 | 4.16 | 4.52 | 4.63 | 4.78 |
| | isoalkanes | 39.29 | 38.96 | 36.81 | 37.10 | 39.54 | 39.21 | 39.01 |
| | olefins | 27.65 | 28.08 | 35.12 | 33.16 | 27.42 | 27.68 | 28.68 |
| | cycloparaffins | 8.62 | 8.45 | 8.03 | 8.06 | 8.78 | 8.87 | 8.59 |
| | aromatics | 19.86 | 19.65 | 16.02 | 17.52 | 19.74 | 19.61 | 18.94 | sieve having MFI structure according to the present invention, the yield of propylene and aromatics content in gasoline increases by a great extent; as compared with Comparative Example 2, the yield of propylene is comparable, but the aromatics content in gasoline increases by a great extent; as compared with Comparative Example 3, the aromatics content in gasoline is comparable, but the yield of propylene increases by a great extent; as compared with Comparative Example 4, the selectivity for propylene and the aromatics content in gasoline are comparable, but the hydrothermal stability is better, and the conversion of the feedstock is enhanced for the aged catalyst sample to a great extent over that of Comparative Example 4; and as compared with Comparative Example 5, the yield of propylene and the aromatics content in gasoline increases to a certain extent. When phosphorus-, ferri- and zinc-modified molecular sieve having MFI structure (Example 12) is used in comparison with the phosphorus- and ferri-modified molecular sieve having MFI structure (Comparative Example 2), the yield of propylene is comparable, but the aromatics content in gasoline is enhanced considerably. In summary, when the conversion is not changed significantly and coke and dry gas do not increase As a result, it can be seen from Table 2 that, as compared with results of Comparative Example 1, when the catalyst is added with the phosphorus- and bimetal-modified molecular significantly, the phosphorus- and bimetal-modified molecular sieve having MFI structure according to the present invention is capable of holding a better hydrothermal stability and in the meantime exhibits excellent performance in increasing the production of lower olefins and increasing aromatics content in gasoline.

Example 14

This Example is to illustrate the effect of the molecular sieve according to the present invention on the yield and selectivity for $C_2$-$C_4$ olefins and the gasoline octane number when the molecular sieve is used in the catalytic cracking catalyst of petroleum hydrocarbons.

The catalyst was formulated as having 20 wt % of the ultra-stable Y-molecular sieve, 30 wt % of a binder and 35 wt % of a carrier with 15 wt % of the molecular sieve having MFI structure added as a shape-selective active component. The catalytic cracking catalyst CAT-1 was prepared by using the phosphorus-, ferri- and zinc-containing molecular sieve prepared in Example 6 as a shape-selective active component. Reference catalysts, CAT-Ref-1 and CAT-Ref-2 catalysts, were prepared by using the phosphorus-modified MFI molecular sieve obtained in Comparative Example 1 and using the phosphorus-, zinc- and rare earth-modified MFI molecular sieve obtained in Comparative Example 5 as a shape-selective active component, respectively.

The aforementioned samples were aged respectively in a fixed-bed aging apparatus at 800° C. with 100% water vapor for 4 hrs, and then pelletized and screen-fractionated into granules with 20-40 mesh, and then evaluated respectively in a micro reaction apparatus for catalytic cracking of heavy oils under conditions of a reaction temperature of 500° C., a regeneration temperature of 600° C., a catalyst-oil ratio of 4 and a catalyst inventory of 5 g. The PONA analysis of gasoline in the products collected after the evaluation was measured by chromatography respectively. Results of the evaluation are shown in Table 3.

TABLE 3

| | Catalyst | | |
|---|---|---|---|
| | CAT-1 | CAT-Ref-1 | CAT-Ref-2 |
| Conversion, m % | 85.47 | 85.29 | 85.34 |
| Product distribution, m % | | | |
| Cracking gas | 45.16 | 43.83 | 44.23 |
| Dry gas | 4.23 | 4.12 | 4.15 |
| Liquefied petroleum gas | 40.93 | 39.71 | 40.08 |
| Gasoline ($C_5$~221° C.) | 33.92 | 35.12 | 34.76 |
| Diesel fuel (221~330° C.) | 9.04 | 9.18 | 9.14 |
| Heavy oil (>330° C.) | 5.49 | 5.53 | 5.52 |
| Coke, | 6.39 | 6.34 | 6.36 |
| In Total | 100.00 | 100.00 | 100.00 |
| Wherein☐gas yield, m % | | | |
| $H_2$ | 0.12 | 0.11 | 0.11 |
| $C_2^=$ | 3.16 | 2.63 | 2.79 |
| $C_3^=$ | 17.94 | 15.63 | 15.92 |
| $C_4^=$ | 11.82 | 10.09 | 10.61 |
| $C_2^= + C_3^= + C_4^=$ | 32.92 | 28.35 | 29.72 |
| $C_3^=$ Concentration in gas, m % | 39.73 | 35.66 | 35.99 |
| Gasoline composition, m % | | | |
| n-alkane | 4.91 | 4.12 | 4.67 |
| Iso-alkane | 38.53 | 37.11 | 38.10 |
| Olefins | 27.78 | 34.32 | 29.04 |
| Naphthenic hydrocarbons | 8.37 | 8.13 | 8.21 |
| Aromatics | 20.41 | 16.32 | 19.98 |

It can be seen from the results in Tables that, as compared with that the molecular sieve provided in Comparative Example 1 is used as the shape-selective active component in the reference catalyst CAT-Ref-1, when the molecular sieve provided in Example 6 according to the present invention is used as the shape-selective active component of the catalytic cracking catalyst, the selectivity for lower olefins and the yield of liquefied petroleum gas increase in the case of the conversion being not changed significantly as well as coke and dry gas being not increased significantly, thus the results lead to a significant increase in the yield of lower olefins and in the meantime a significant increase in the aromatics content in gasoline by 4 percents; as compared with the Reference Catalyst CAT-Ref-2 which is prepared by using the molecular sieve provided in Comparative Example 5 as the shape-selective active component, the aromatics content in gasoline is comparable, but the selectivity for lower olefins is enhanced remarkably and the yield of lower olefins is also enhanced significantly. These results show that when the molecular sieve according to the present invention is used in a catalytic cracking catalyst, the catalytic cracking catalyst exhibits excellent performance in increasing yield of lower olefins whilst increasing the aromatics content in gasoline.

The invention claimed is:

1. A phosphorus- and metal components-containing MFI-structured molecular sieve having a formula expressed in an anhydrous form and on a basis of oxide weight, as follows: (0~0.3) $Na_2O$ (0.5~5.5) $Al_2O_3$ (1.3~10) $P_2O_5$ (0.7~15) $M1_xO_y$ (0.01~5) $M2_mO_n$ (70~97) $SiO_2$, wherein M1 is a metal selected from the group consisting of Fe, Co, and Ni; x represents the number of atoms of M1; y represents a number required by an oxidation state of M1; M2 is selected from the group consisting of Zn, Mn, Ga, and Sn; m represents the number of atoms of M2; and n represents a number required by an oxidation state of M2.

2. The molecular sieve of claim 1 having a formula expressed in the anhydrous form and on the basis of oxide weight as follows: (0~0.2) $Na_2O$ (0.9~5.0) $Al_2O_3$ (1.5~7) $P_2O_5$ (0.9~10) $M1_xO_y$ (0.5~2) $M2_mO_n$ (82~92) $SiO_2$.

3. The molecular sieve of claim 1 wherein M1 is Fe and M2 is Zn.

4. The molecular sieve of claim 1 wherein M1 is Fe and M2 is Mn.

5. The molecular sieve of claim 1 wherein M1 is Fe and M2 is Ga.

6. The molecular sieve of claim 1 wherein said M1 is Fe and M2 is Sn.

7. The molecular sieve of claim 1 wherein M1 is Co and M2 is Mn.

8. The molecular sieve of claim 1 wherein M1 is Ni and M2 is Mn.

9. The molecular sieve of claim 1 which is a ZSM-5 molecular sieve.

10. A catalyst or additive for catalytic cracking of petroleum hydrocarbons comprising a molecular sieve of claim 1 as a shape-selective active component.

11. A process for preparing a phosphorus- and metal components-containing MFI-structured molecular sieve of claim 1, characterized by the steps of:
ion-exchanging an Na-type molecular sieve having a MFI structure in a weight ratio of molecular sieve:ammonium salt:$H_2O$=1:(0.1~1):(5~10) at a temperature from room temperature to 100° C. for 0.3~1 hours;
filtering;
introducing phosphorus and transition metals M1 and M2 to modify the molecular sieve, wherein M1 is a metal selected from the group consisting of Fe, Co, and Ni, and M2 is a metal selected from the group consisting of Zn, Mn, Ga, and Sn; and calcining at 400-800° C. for 0.5~8 hrs.

12. The process of claim 11 wherein said calcining step is carried out under a water vapor atmosphere.

13. The process of claim 11 wherein said modification is carried out by impregnating or ion-exchanging.

14. The process of claim 13 wherein said step of introducing phosphorus and transition metals M1 and M2 to modify the molecular sieve is carried out by stirring homogeneously the ammonium-exchanged filter cake with an aqueous solution having a calculated amount of a phosphorus-containing compound at a temperature from room temperature to 95° C., oven-drying the resultant slurry, calcining the dried solid at 400~800° C., then mixing homogeneously the calcined solid with an aqueous solution having a calculated amount of a compound containing metal M1 and a compound containing metal M2 at a temperature from room temperature to 95° C., and oven-drying the resultant mixture.

15. The process of claim 13 wherein said step of introducing phosphorus and transition metals M1 and M2 to modify the molecular sieve is carried out by stirring homogeneously the ammonium-exchanged filter cake with an aqueous solution having a calculated amount of a phosphorus-containing compound at a temperature from room temperature to 95° C., oven-drying the resultant slurry, calcining the dried solid at 400~800° C., then mixing homogeneously the calcined solid with an aqueous solution having a calculated amount of a compound containing metal M1 at a temperature from room temperature to 95° C., and oven-drying the resultant mixture; calcining the dried solid at 400~800° C., and mixing homogeneously the calcined solid with an aqueous solution having a calculated amount of a compound containing metal M2 at a temperature from room temperature to 95° C., and oven-drying the resultant mixture, wherein the two metal components to be supported can be added in any order.

16. The process of claim 13 wherein said step of introducing phosphorus and transition metals M1 and M2 to modify the molecular sieve is carried out by stirring homogeneously the ammonium-exchanged filter cake with an aqueous solution having a calculated amount of a phosphorus-containing compound at a temperature from room temperature to 95° C., oven-drying the resultant slurry, then mixing homogeneously with an aqueous solution having a calculated amount of a compound containing metal M1 and a compound containing metal M2 at a temperature from room temperature to 95° C., and oven-drying the resultant mixture, wherein the two metal components to be supported can be added in any order.

17. The process of claim 13 wherein said step of introducing phosphorus and transition metals M1 and M2 to modify the molecular sieve is carried out by stirring homogeneously the ammonium-exchanged filter cake with an aqueous solution having a calculated amount of a phosphorus-containing compound at a temperature from room temperature to 95° C., oven-drying the resultant slurry, then mixing homogeneously with an aqueous solution having a calculated amount of a compound containing metal M1 at a temperature from room temperature to 95° C., and oven-drying the resultant mixture; and mixing homogeneously with an aqueous solution having a calculated amount of a compound containing metal M2 at a temperature from room temperature to 95° C., and oven-drying the resultant mixture, wherein the two metal components to be supported can be added in any order.

18. The process of claim 13 wherein said step of introducing phosphorus and transition metals M1 and M2 to modify the molecular sieve is carried out by stirring homogeneously the ammonium-exchanged filter cake with an aqueous solution having a calculated amount of a phosphorus-containing compound, a compound containing metal M1, and a compound containing metal M2 at a temperature from room temperature to 95° C., and oven-drying the resultant slurry.

19. The process of claim 13 wherein said step of introducing phosphorus and transition metals M1 and M2 to modify the molecular sieve is carried out by stirring homogeneously said ammonium-exchanged filter cake with an aqueous solution having a calculated amount of a phosphorus-containing compound at a temperature from room temperature to 95° C., oven-drying the resultant slurry, calcining the dried solid at 400~800° C., and after mixing homogeneously the calcined solid with an aqueous solution having a calculated amount of a compound containing metal M1 and a compound containing metal M2 in a solid:liquid ratio of 1:(5~20), stirring the resultant mixture at 80~95° C. and pH 4-7 for 2~3 hours, then filtering the mixture, wherein the ion-exchange can be repeated a plurality of times, and the exchanged sample can be washed with water a plurality of times before oven-drying the washed sample.

20. The process of claim 11 wherein the phosphorus is introduced using a phosphorus-containing compound selected from the group consisting of phosphoric acid, ammonium hydrogen phosphate, ammonium dihydrogen phosphate or ammonium phosphate, and a mixture thereof.

21. The process of claim 11 wherein said metal M1 and said metal M2 are introduced as water soluble salts.

22. The process of claim 21 wherein said water soluble salts are selected from the group consisting of sulfate, nitrate, and chloride salts.

* * * * *